Aug. 10, 1965  E. ROBERTSON ETAL  3,199,225
RESUSCITATION TEACHING APPARATUS
Filed Oct. 8, 1963
2 Sheets-Sheet 1
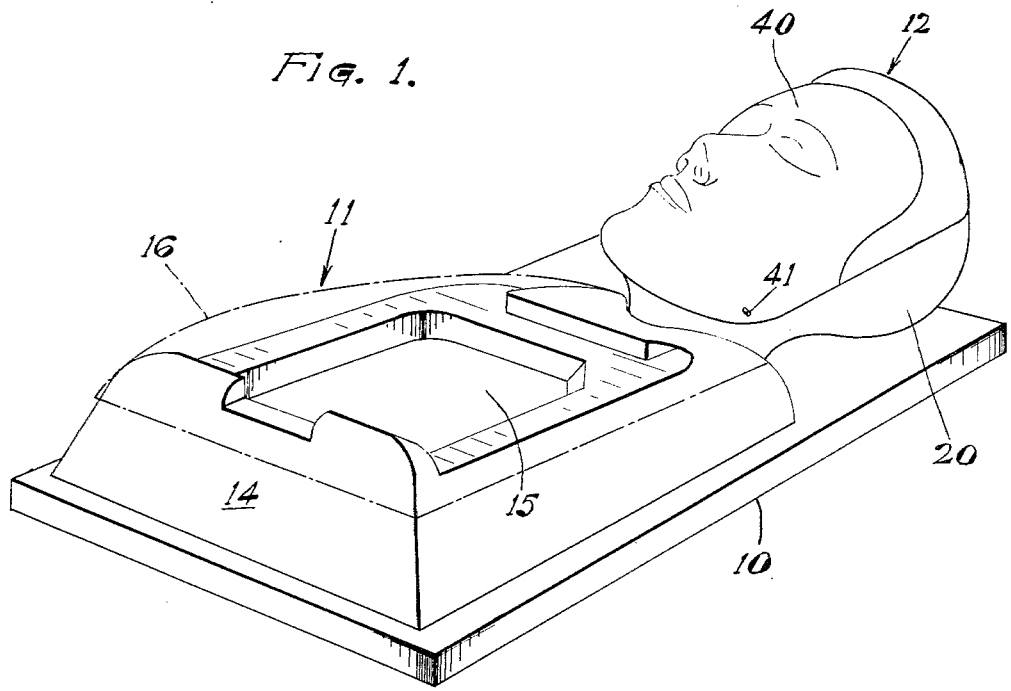
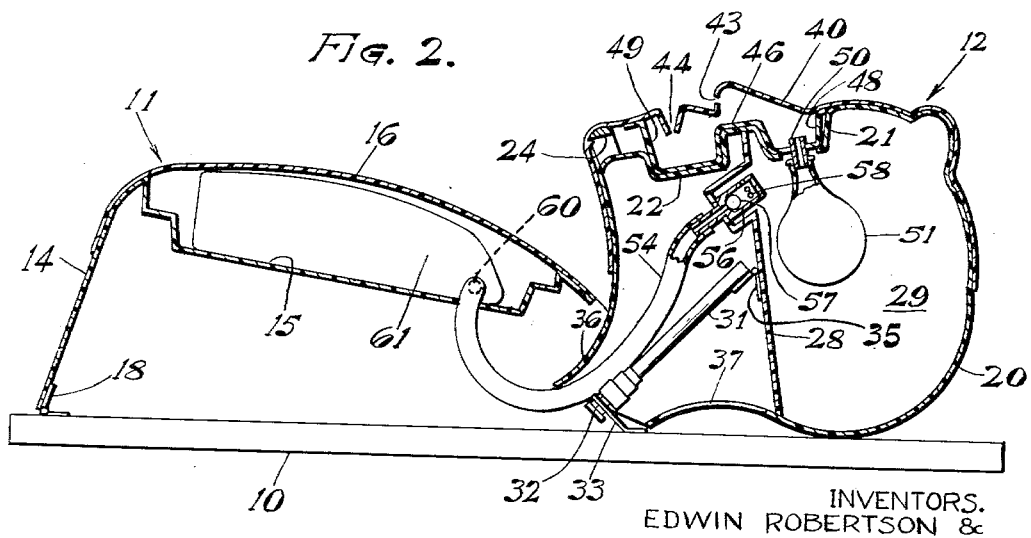
INVENTORS.
EDWIN ROBERTSON &
JOHN N. ROBERTSON
BY Christel & Bean
ATTORNEYS Aug. 10, 1965  E. ROBERTSON ETAL  3,199,225
RESUSCITATION TEACHING APPARATUS
Filed Oct. 8, 1963  2 Sheets-Sheet 2
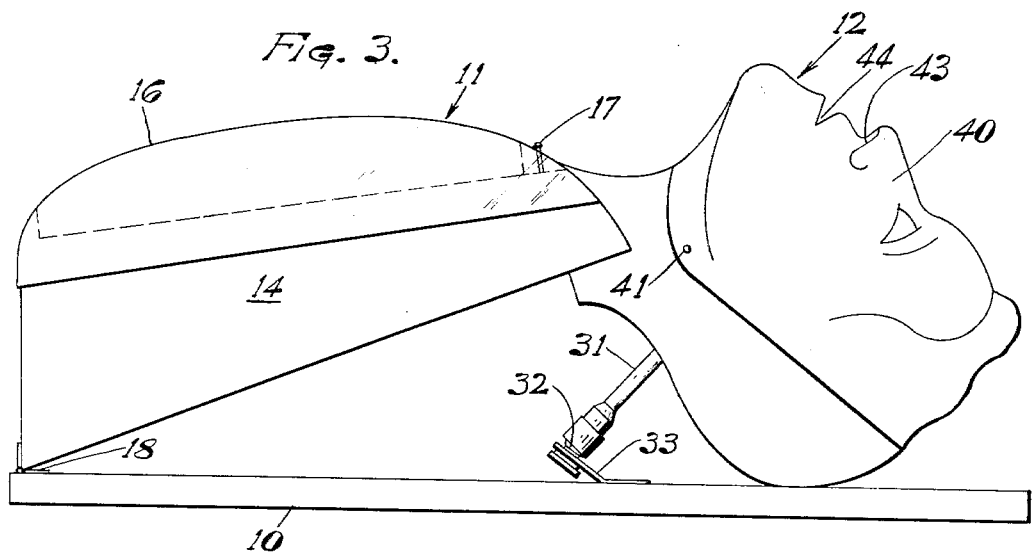
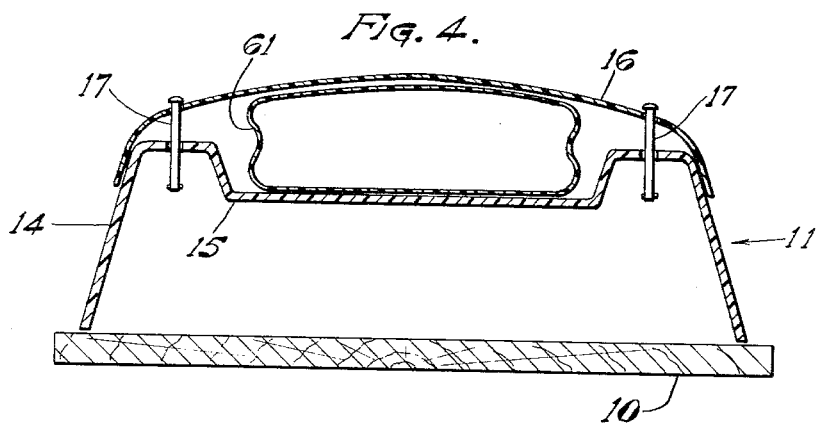
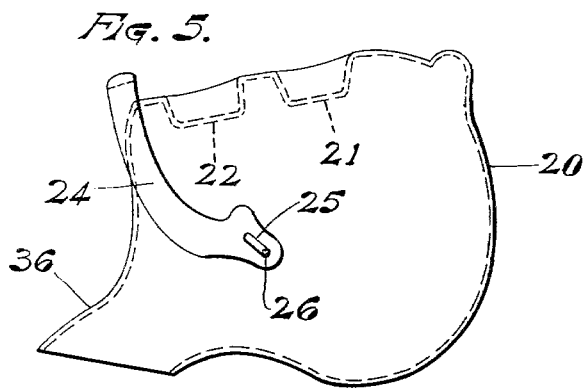
INVENTORS.
EDWIN ROBERTSON &
JOHN N. ROBERTSON
BY *Christel & Bean*
ATTORNEYS

United States Patent Office 3,199,225
Patented Aug. 10, 1965

3,199,225
RESUSCITATION TEACHING APPARATUS
Edwin Robertson, 425 Lamarck Drive, and John N. Robertson, 456 Darwin Drive, both of Cheektowaga 25, N.Y.
Filed Oct. 8, 1963, Ser. No. 314,761
8 Claims. (Cl. 35—17)

This invention relates to resuscitation training apparatus and particularly to apparatus or teaching mouth-to-mouth or mouth-to-nose insufflation.

In prior art apparatus for teaching so-called mouth-to-mouth breathing a considerable problem is presented by reason of the fact that use of the apparatus by successive persons, trainees or instructors as the case may be, is unsanitary and unhygienic. In teaching the techniques of oral and nasal insufflation by mouth-to-mouth and mouth-to-nose breathing it is necessary for an instructor to demonstrate correct methods and usually a number of trainees will be expected to practice the methods and techniques on a given piece of apparatus.

It is accordingly highly desirable that an arrangement be provided whereby the mouth of one person is not required to contact a portion of the apparatus which has been contacted by a previous user. Furthermore, even when means are provided which avoid such direct contact, it is usual for the air breathed into the apparatus by one user to remain at least partially in the apparatus so that a subsequent user breathes or otherwise comes into contact with air blown into the apparatus by a previous user.

The apparatus of the present invention provides a resuscitation training apparatus wherein this unhygienic and potentially harmful mouth contact and the exposure to air blown into the apparatus by previous users is obviated in a simple and thoroughly effective manner.

The present invention further provides a mannikin device wherein a chest or upper torso portion and a head portion are articulated and supported in a novel manner to provide a mouth-to-mouth breathing training apparatus which provides, in a very simple structure and one which may be economically manufactured, all of the required head movements necessary for complete demonstration and instruction.

In cases where the restoring of respiration by mouth-to-mouth breathing is indicated, such as in the case of drowning victims, the windpipe is frequently blocked because the lower jaw is dropped, whereby the tongue blocks the windpipe. The block can be removed if the rescuer bends the head of the victim well backward. In addition to this, the lower jaw of the victim or unconscious person should be lifted by the rescuer. Accordingly, a potential rescuer should be trained to place the head and lower jaw of the unconscious person in such position that air can pass unhindered to the lungs from the oral or nasal passages.

In addition to properly positioning the head and jaw of the unconscious person, the rescuer must be certain that the mouth-to-mouth or mouth-to-nose insufflation is supplying air in proper quantity and at the right frequency to properly inflate and deflate the lungs of the victim. The present apparatus provides a simple but very effective structure which meets the foregoing requirements.

Various other objects and advantages of the training apparatus of the present invention will appear to those skilled in the art from a study of the accompanying drawings and the following detailed description of the embodiment illustrated in the drawings. However, it is to be understood that such embodiment is by way of example only and that various modifications and mechanical variations may be introduced without departing from the principles of the invention, the scope of which is limited only as defined in the appended claims.

In the drawings:
FIG. 1 is a general perspective view of one form of the resuscitation teaching device of the present invention;
FIG. 2 is a longitudinal cross sectional view of the apparatus of FIG. 1;
FIG. 3 is a view similar to FIG. 2 but in elevation and with the parts in an operative position;
FIG. 4 is a transverse cross sectional view of the apparatus of FIG. 1 through the chest portion thereof; and
FIG. 5 is a side elevational view of the main body portion of the head member.

Like characters of reference denote like parts throughout the several figures of the drawings and, as indicated in FIGS. 1, 2 and 3, the numeral 10 designates a base board member upon which are mounted an upper torso or chest member designated generally by the reference numeral 11 and a head member designated generally by the reference numeral 12.

The torso member 11 comprises a relatively rigid thin-walled upwardly convex shell member 14 which may be of molded sheet plastic material or of any other desired construction. Shell member 14 has a concavity or depression formed in its upper surface as at 15 for a purpose which will presently appear. A further upwardly convex thin-walled member 16, also relatively rigid, fits over the upper portion of torso shell member 14 and is loosely connected thereto so that it is free to raise upwardly from the member 11 to a limited degree. To this end the convex member 16 is connected to member 14 by a number of vertically extending pins 17 which pass through the upper wall portions of members 14 and 16 as clearly shown in FIG. 4 and are headed at their opposite ends to limit relative raising movement of the upper member 16. Member 16 may also be of molded sheet plastic material or other desired construction and its upper surface is preferably formed to simulate the chest of a victim of a mishap or other patient.

The shell member 14 of torso member 11 is hinged to base board 10 along the lower edge of member 11, that is, along the edge which is remote from the head member 12, as indicated at 18 in FIGS. 2 and 3.

The main body portion of head member 12 comprises a relatively thin-walled shell 20 which is relatively rigid and simulates a complete human head excepting in the region of the nose and mouth where the shell member 20 is formed with a pair of concavities or depressions which are shown at 21 and 22, respectively, in FIGS. 2 and 5. A generally U-shaped jaw simulating member 24 is slotted at its opposite ends as shown at 25 in FIG. 5 and is pivotally connected to head member shell 20 as at 26, thus simulating the condyle joint between the human jaw and the skull.

A generally impervious wall 28 extends across the interior of shell member 20 as shown in FIG. 2, being disposed generally between the depressions or cavities 21 and 22 in the present instance. Thus wall 28 cooperates with the upper portion of shell member 20 of the head member 12 to form an air chamber 29.

Head member 12 is pivotally connected to base board 10 by means of a rod 31, see FIG. 2, which has a ball joint swivel connection at its lower end as at 32 with a bracket or clip 33 fixed to base board 10. The upper end of rod 31 is hinged to the intermediate wall 28 of the head member as at 35. From the foregoing it will be seen that lifting movement of the lower portion of head member 12 by an instructor or trainee which pivots the same about rod 31 also raises the torso member 11 about hinge 18 by engagement of the front neck portion 36 of shell member 20 beneath the overlying upper wall portion of torso member 11. Shell member 20 is slotted along its lower rear portion as at 37 in FIG. 2 to accommodate bar 31 and permit full pivotal raising movement of head member 12.

It was noted above that the face portion of the head shell member 20 contains depressions 21 and 22. The outer face portion of the head of the mannikin is formed by a mask 40 which is of relatively limp flexible material such as sheet rubber. In the present instance the mask 40 is applied by placing its upper portion over the top front portion of head shell member 20 and then engaging apertures in the lower portion of mask 40 over a pair of pins 41 which project from the shell member at the sides of the jaw portions thereof.

Mask 40 is molded to simulate the face of a victim or patient and as shown in FIG. 2 contains nostril openings 43 and a normally open mouth formation 44. A further molded member 46 which may or may not be flexible is permanently attached to the interior surface of mask 40 and contains a pair of well formations 48 and 49 which register and interfit with the depressions 21 and 22, respectively, of the shell member 20, as clearly shown in FIG. 2.

This interfitting of the formations 48 and 49 with the depressions 21 and 22 accurately locates the somewhat limp mask 40 with respect to the head member shell 20. A nipple 50 is secured in the bottom of well formation 48 and extends through an opening in the bottom of depression 21 as shown in FIG. 2. A rubber balloon of the type commonly used as a toy is designated 51 in FIG. 2 and fits over the end of nipple 50, being disposed in chamber 29. The rubber balloon 51 serves as a resilient diaphragm between the chamber defined by the mask 40 and well formations 48 and 49, on the one hand, and air chamber 29, on the other. Pneumatically the interior of balloon 51 constitutes a part of the former chamber.

Still referring principally to FIG. 2, a flexible conduit 54 extends between wall 28 and a wall portion of the depression 15 of torso shell member 14. At the wall 28 conduit 54 connects with a valve housing 56 which contains a ball valve 57, the housing 56 having an opening or openings 58 whereby its interior is in fluid communication with chamber 29. In the position illustrated in FIG. 2 ball valve 57 closes conduit 54 by gravity action, serving as a check valve to prevent fluid flow from chamber 29 into conduit 54. If head member 12 is pivoted rearwardly as shown in FIG. 3 ball valve 57 falls to the other end of housing 56 under the force of gravity and free fluid communication between chamber 29 and conduit 54 is established.

At the torso end thereof conduit 54 terminates in connection with a nipple 60 which may be fixed in the wall of depression 15 of member 14. A flexible bag 61 of plastic film or the like connects detachably with nipple 60 within the depression 15.

The operation of the foregoing apparatus is as follows. The operator places his hand behind the neck of the head member and lifts the same, whereby the head is thrown back as in FIG. 3 and the adjacent torso portion is raised as in the case of a human patient or victim. At the same time the operator presses against U-shaped jaw member 24 as in a jaw closing movement. Since the valve 57 is now open air may move to bag 61 from chamber 29.

Accordingly, if an operator blows into the mouth opening 44, holding the nose to close the nostril openings 43 as is required in a human victim, air is blown into toy balloon 51 which thus constitutes an expansible diaphragm and displaces a like amount of air in chamber 29 exteriorly of balloon 51. This displaced air is transmitted to the expansible flexible bag 61, assuming that the head is properly in a rearward position so that valve 57 is open, and if a sufficient quantity of air enters bag 61 the upper chest member 16 raises as in normal respiration, thus indicating insufflation, and lowers when the operator removes his mouth from the mouth opening 44.

It will thus be noted that air from the mouth and lungs of the instructor or trainee does not enter the principal air compartments and passages of the apparatus and gets no farther than the interior of balloon 51. When a new operator takes over, the mask may be removed and another substituted. The mask may be cleansed or sterilized in any desired manner and the balloon 51 may be discarded and replaced.

A similar operation takes place in the case of mouth-to-nose insufflation excepting that the operator blows through the nose openings 43 and holds the mouth opening closed by pressing upwardly on the U-shaped jaw member 24 and holding the lips of the mouth closed.

We claim:

1. Apparatus for demonstrating and teaching respiratory insufflation by mouth-to-mouth or mouth-to-nose breathing comprising a torso member and a head member, said torso member including means expansible upon application of fluid pressure thereto, said head member comprising a hollow member generally simulating a human head, a flexible face mask adapted to be detachably secured to the face surface of said head member, a fluid chamber in said head member and conduit means from said chamber to said expansible means, a chamber at the rear side of said mask and mouth and nose openings in said mask opening into said mask chamber, an expansible balloon connected with said mask chamber and extending into said head member fluid chamber, whereby air blown into said balloon through said mask openings and said mask chamber expands said balloon and thus displaces air in said head chamber to cause fluid flow therefrom to said torso member expansible means.

2. Apparatus for demonstrating and teaching mouth-to-mouth or mouth-to-nose breathing comprising a torso member and a head member, said torso member including means expansible upon application of fluid pressure thereto, said head member comprising a hollow member generally simulating a human head, a face portion adapted to be detachably secured to said head member, and resilient diaphragm means dividing the interior of said hollow head member into a pair of fluid chambers, said face portion having mouth and nose openings into one of said fluid chambers, and conduit means from the other of said chambers to said expansible means, whereby air blown into said mouth or nose openings of said face portion distends said diaphragm and thus displaces air in said other fluid chamber to cause fluid flow therefrom to said torso member expansible means.

3. Apparatus for demonstrating and teaching mouth-to-mouth or mouth-to-nose breathing comprising a torso member and a head member, said torso member including means expansible upon application of fluid pressure thereto, said head member comprising a hollow member generally simulating a human head, a flexible face mask adapted to be detachably secured to the face surface of said head member, a fluid chamber in said head member and conduit means from said chamber to said expansible means, mouth and nose openings in said mask, an expansible balloon connected with said openings and extending into said head member fluid chamber, whereby air blown into said balloon through said mask openings expands said balloon and thus displaces air in said head chamber to cause fluid flow therefrom to said torso member expansible means.

4. Apparatus for demonstrating and teaching respiratory insufflation by mouth-to-mouth or mouth-to-nose breathing comprising a torso member and a head member, said torso member including a portion movable outwardly upon application of fluid pressure thereto, said head member comprising a hollow member generally simulating a human head, a face portion adapted to be detachably secured to said head member, a fluid chamber in said head member and conduit means from said chamber to said torso member movable portion, mouth and nose openings in said face portion, an expansible balloon connected with said openings and extending into said head member fluid chamber, whereby air blown into said balloon through said openings expands said balloon and thus displaces air in said head chamber to cause fluid flow therefrom to said torso member movable portion.

5. Apparatus for demonstrating and teaching respiratory insufflation by mouth-to-mouth or mouth-to-nose breathing comprising a torso member and a hollow head member, said torso member including fluid pressure responsive means for indicating insufflation, a fluid chamber in said head member and conduit means from said chamber to said fluid pressure responsive means, mouth and nose openings in said head member, an expansible balloon connected with said openings and extending into said head member fluid chamber, whereby air blown into said balloon through said openings expands said balloon and thus displaces air in said head chamber to cause fluid flow therefrom to said torso member fluid pressure responsive means.

6. Apparatus for demonstrating and teaching respiratory insufflation by mouth-to-mouth or mouth-to-nose breathing comprising a torso member and a hollow head member, said torso member including fluid pressure responsive means for indicating insufflation, resilient diaphragm means dividing the interior of said hollow head member into a pair of fluid chambers, said head member having mouth and nose openings into one of said fluid chambers, and conduit means from the other of said chambers to said fluid pressure responsive means, whereby air blown into said openings distends said diaphragm and thus displaces air in said other fluid chamber to cause fluid flow therefrom to said torso member fluid pressure responsive means.

7. Apparatus for demonstrating and teaching respiratory insufflation by mouth-to-mouth or mouth-to-nose breathing comprising a base member having a torso member and a head member disposed thereon, said head member comprising a means generally simulating a human head, said head member including a neck portion extending beneath a proximal upper wall portion of said torso member, the distal portion of said torso member being hinged to said base member, link means connecting said head member to said base member for pivotal movement of said head member with the rear portion thereof resting upon said base member, said head member neck portion being adapted to slidably engage beneath said proximal torso wall portion to raise the torso member about said hinge means when said head member is raised by pivotal movement thereof.

8. Apparatus for simulating resuscitation by mouth-to-mouth breathing comprising a torso member and a hollow head member, said torso member including fluid pressure responsive means for indicating insufflation, resilient diaphragm means dividing the interior of said hollow head member into a pair of fluid chambers, said head member having a mouth opening into one of said fluid chambers, and conduit means from the other of said chambers to said fluid pressure responsive means, whereby air blown into said mouth opening distends said diaphragm and thus displaces air in said other fluid chamber to cause fluid flow therefrom to said torso member fluid responsive means.

References Cited by the Examiner

UNITED STATES PATENTS

| 3,049,811 | 8/62 | Ruben | 35—17 |
| 3,068,590 | 12/62 | Padellford | 35—17 |

FOREIGN PATENTS

| 934,755 | 8/63 | Great Britain. |

EUGENE R. CAPOZIO, *Primary Examiner.*